(12) United States Patent
Zhang et al.

(10) Patent No.: US 12,433,587 B2
(45) Date of Patent: Oct. 7, 2025

(54) SURGICAL STAPLING DEVICE INCLUDING A LOADING UNIT ALIGNMENT INDICATOR

(71) Applicant: Covidien LP, Mansfield, MA (US)

(72) Inventors: Xiliang Zhang, Shanghai (CN); Syed Sarfraz Ahamed, Shanghai (CN)

(73) Assignee: Covidien LP, Mansfield, MA (US)

( * ) Notice: Subject to any disclaimer, the term of this patent is extended or adjusted under 35 U.S.C. 154(b) by 196 days.

(21) Appl. No.: 18/284,790

(22) PCT Filed: Mar. 30, 2021

(86) PCT No.: PCT/CN2021/083964
§ 371 (c)(1),
(2) Date: Sep. 28, 2023

(87) PCT Pub. No.: WO2022/204942
PCT Pub. Date: Oct. 6, 2022

(65) Prior Publication Data
US 2024/0173029 A1 May 30, 2024

(51) Int. Cl.
*A61B 17/072* (2006.01)
*A61B 90/00* (2016.01)

(52) U.S. Cl.
CPC ............ *A61B 17/072* (2013.01); *A61B 90/08* (2016.02); *A61B 2017/07221* (2013.01); *A61B 2090/0808* (2016.02)

(58) Field of Classification Search
CPC ............................. A61B 17/072; A61B 90/08
See application file for complete search history.

(56) References Cited

U.S. PATENT DOCUMENTS

| 1,158,111 A | 10/1915 | Ahlheim |
| 2,891,250 A | 6/1959 | Hirata |
| 3,080,564 A | 3/1963 | Strekopitov et al. |

(Continued)

FOREIGN PATENT DOCUMENTS

| CN | 106923875 A | 7/2017 |
| CN | 108472036 B | 7/2021 |

(Continued)

OTHER PUBLICATIONS

International Search Report for Application No. PCT/CN2021/083964 dated Jan. 7, 2022.

(Continued)

*Primary Examiner* — Nathaniel C Chukwurah

(57) ABSTRACT

An end effector includes a frame and a loading unit. The frame includes first and second transverse portions and a longitudinal portion interconnecting the first and second transverse portions. The longitudinal portion includes a coupling portion including a visual indicator. The loading unit includes an anvil plate supported on the first transverse portion of the frame, a base portion extending proximally from the anvil plate, and a cartridge assembly supported on the base portion and movable in relation to the anvil plate between spaced and clamped positions. The base portion includes a flange configured to engage the coupling portion of the longitudinal portion of the frame such that the visual indicator is concealed by the flange when the loading unit is in registration with the frame.

19 Claims, 5 Drawing Sheets

(56) References Cited

U.S. PATENT DOCUMENTS

| | | | |
|---|---|---|---|
| 3,252,643 A | 5/1966 | Strekopov et al. | |
| 3,269,630 A | 8/1966 | Fleischer | |
| 3,275,211 A | 9/1966 | Hirsch et al. | |
| 3,315,863 A | 4/1967 | O'Dea | |
| 3,494,533 A | 2/1970 | Green et al. | |
| 3,589,589 A | 6/1971 | Akopov | |
| 3,692,224 A | 9/1972 | Astafiev et al. | |
| 3,795,034 A | 3/1974 | Strekopytov et al. | |
| 3,822,818 A | 7/1974 | Strekopytov et al. | |
| 3,935,981 A | 2/1976 | Akopov et al. | |
| 3,949,923 A | 4/1976 | Akopov et al. | |
| 4,047,654 A | 9/1977 | Alvarado | |
| 4,216,891 A | 8/1980 | Behlke | |
| 4,244,372 A | 1/1981 | Kapitanov et al. | |
| 4,296,881 A | 10/1981 | Lee | |
| 4,305,539 A | 12/1981 | Korolkov et al. | |
| 4,354,628 A | 10/1982 | Green | |
| 4,378,901 A | 4/1983 | Akopov et al. | |
| 4,383,634 A | 5/1983 | Green | |
| 4,402,444 A | 9/1983 | Green | |
| 4,415,112 A | 11/1983 | Green | |
| D273,513 S | 4/1984 | Spreckelmeier | |
| 4,442,964 A | 4/1984 | Becht | |
| 4,470,533 A | 9/1984 | Schuler | |
| 4,475,679 A | 10/1984 | Fleury, Jr. | |
| 4,485,811 A | 12/1984 | Chernousov et al. | |
| 4,506,670 A | 3/1985 | Crossley | |
| 4,506,671 A | 3/1985 | Green | |
| 4,508,253 A | 4/1985 | Green | |
| 4,522,327 A | 6/1985 | Korthoff et al. | |
| 4,527,724 A * | 7/1985 | Chow | A61B 17/072 227/19 |
| 4,530,453 A | 7/1985 | Green | |
| 4,550,870 A | 11/1985 | Krumme et al. | |
| 4,566,620 A | 1/1986 | Green et al. | |
| 4,568,009 A * | 2/1986 | Green | A61B 17/072 227/19 |
| 4,573,622 A | 3/1986 | Green et al. | |
| 4,580,712 A | 4/1986 | Green | |
| 4,585,153 A | 4/1986 | Failla et al. | |
| 4,589,582 A | 5/1986 | Bilotti | |
| 4,602,634 A | 7/1986 | Barkley | |
| 4,605,001 A | 8/1986 | Rothfuss et al. | |
| 4,605,004 A | 8/1986 | Di Giovanni et al. | |
| 4,606,344 A | 8/1986 | Di Giovanni | |
| 4,606,345 A | 8/1986 | Dorband et al. | |
| 4,607,636 A | 8/1986 | Kula et al. | |
| 4,612,933 A | 9/1986 | Brinkerhoff et al. | |
| 4,617,928 A | 10/1986 | Alfranca | |
| 4,632,290 A | 12/1986 | Green et al. | |
| 4,665,916 A | 5/1987 | Green | |
| 4,684,051 A | 8/1987 | Akopov et al. | |
| 4,714,187 A | 12/1987 | Green | |
| 4,715,520 A | 12/1987 | Roehr, Jr. et al. | |
| 4,728,020 A | 3/1988 | Green et al. | |
| 4,767,044 A | 8/1988 | Green | |
| 4,788,978 A | 12/1988 | Strekopytov et al. | |
| 4,802,614 A | 2/1989 | Green et al. | |
| 4,805,823 A | 2/1989 | Rothfuss | |
| 4,819,853 A | 4/1989 | Green | |
| 4,848,637 A | 7/1989 | Pruitt | |
| 4,869,414 A | 9/1989 | Green et al. | |
| 4,881,544 A | 11/1989 | Green et al. | |
| 4,881,545 A | 11/1989 | Isaacs et al. | |
| 4,915,100 A | 4/1990 | Green | |
| 4,930,503 A | 6/1990 | Pruitt | |
| 4,938,408 A | 7/1990 | Bedi et al. | |
| 4,941,623 A | 7/1990 | Pruitt | |
| 4,951,861 A | 8/1990 | Schulze et al. | |
| 4,964,559 A | 10/1990 | Deniega et al. | |
| 5,005,754 A | 4/1991 | Van Overloop | |
| 5,018,657 A | 5/1991 | Pedlick et al. | |
| 5,071,052 A | 12/1991 | Rodak et al. | |
| 5,100,042 A | 3/1992 | Gravener et al. | |
| 5,116,349 A | 5/1992 | Aranyi | |
| 5,137,198 A | 8/1992 | Nobis et al. | |
| 5,172,845 A | 12/1992 | Tejeiro | |
| 5,190,203 A | 3/1993 | Rodak | |
| 5,219,111 A | 6/1993 | Bilotti et al. | |
| 5,240,163 A | 8/1993 | Stein et al. | |
| 5,344,060 A | 9/1994 | Gravener et al. | |
| 5,368,599 A | 11/1994 | Hirsch et al. | |
| 5,405,073 A | 4/1995 | Porter | |
| 5,413,267 A | 5/1995 | Solyntjes et al. | |
| 5,439,155 A | 8/1995 | Viola | |
| 5,452,836 A | 9/1995 | Huitema et al. | |
| 5,458,279 A | 10/1995 | Plyley | |
| 5,462,215 A * | 10/1995 | Viola | A61B 17/072 227/176.1 |
| 5,464,144 A | 11/1995 | Guy et al. | |
| 5,465,894 A | 11/1995 | Clark et al. | |
| 5,470,006 A * | 11/1995 | Rodak | A61B 17/072 227/176.1 |
| 5,470,008 A | 11/1995 | Rodak | |
| 5,470,009 A | 11/1995 | Rodak | |
| 5,497,934 A | 3/1996 | Brady et al. | |
| 5,503,320 A | 4/1996 | Webster et al. | |
| 5,509,596 A | 4/1996 | Green et al. | |
| 5,542,594 A | 8/1996 | McKean et al. | |
| 5,547,117 A | 8/1996 | Hamblin et al. | |
| 5,558,266 A | 9/1996 | Green et al. | |
| 5,571,285 A | 11/1996 | Chow et al. | |
| 5,579,978 A | 12/1996 | Green et al. | |
| 5,580,067 A | 12/1996 | Hamblin et al. | |
| 5,603,443 A | 2/1997 | Clark et al. | |
| 5,605,272 A | 2/1997 | Witt et al. | |
| 5,605,273 A | 2/1997 | Hamblin et al. | |
| 5,607,094 A | 3/1997 | Clark et al. | |
| 5,615,820 A | 4/1997 | Viola | |
| 5,641,111 A | 6/1997 | Ahrens et al. | |
| 5,678,748 A | 10/1997 | Plyley et al. | |
| 5,697,543 A | 12/1997 | Burdorff | |
| 5,706,997 A | 1/1998 | Green et al. | |
| 5,706,998 A | 1/1998 | Plyley et al. | |
| 5,732,871 A | 3/1998 | Clark et al. | |
| 5,735,445 A | 4/1998 | Vidal et al. | |
| 5,794,834 A | 8/1998 | Hamblin et al. | |
| 5,810,240 A | 9/1998 | Robertson | |
| 5,855,311 A | 1/1999 | Hamblin et al. | |
| 5,878,937 A | 3/1999 | Green et al. | |
| 5,893,506 A | 4/1999 | Powell | |
| 5,894,979 A | 4/1999 | Powell | |
| 5,964,394 A | 10/1999 | Robertson | |
| 6,045,560 A | 4/2000 | McKean et al. | |
| 6,638,285 B2 | 10/2003 | Gabbay | |
| 6,805,273 B2 | 10/2004 | Bilotti et al. | |
| 6,817,508 B1 | 11/2004 | Racenet et al. | |
| 6,988,650 B2 | 1/2006 | Schwemberger et al. | |
| 7,070,083 B2 | 7/2006 | Jankowski | |
| 7,134,587 B2 | 11/2006 | Schwemberger et al. | |
| 7,147,139 B2 | 12/2006 | Schwemberger et al. | |
| 7,147,140 B2 | 12/2006 | Wukusick et al. | |
| 7,204,404 B2 | 4/2007 | Nguyen et al. | |
| 7,207,472 B2 * | 4/2007 | Wukusick | A61B 17/072 227/181.1 |
| 7,210,609 B2 | 5/2007 | Leiboff et al. | |
| 7,237,708 B1 | 7/2007 | Guy et al. | |
| 7,275,674 B2 | 10/2007 | Racenet et al. | |
| RE40,237 E | 4/2008 | Bilotti et al. | |
| 7,407,076 B2 | 8/2008 | Racenet et al. | |
| 7,431,190 B2 | 10/2008 | Hoffman | |
| 7,522,854 B2 | 4/2009 | Kinouchi et al. | |
| 7,549,563 B2 | 6/2009 | Mather et al. | |
| 7,568,605 B2 | 8/2009 | Kruszynski | |
| 7,641,092 B2 | 1/2010 | Kruszynski et al. | |
| 7,717,312 B2 | 5/2010 | Beetel | |
| 7,731,073 B2 | 6/2010 | Wixey et al. | |
| 7,735,704 B2 | 6/2010 | Bilotti | |
| 7,766,207 B2 | 8/2010 | Mather et al. | |
| 7,810,690 B2 | 10/2010 | Bilotti et al. | |
| 7,828,188 B2 | 11/2010 | Jankowski | |
| 7,886,953 B2 | 2/2011 | Schwemberger et al. | |
| 8,016,176 B2 | 9/2011 | Kasvikis et al. | |
| 8,029,520 B2 | 10/2011 | Korvick et al. | |

(56) References Cited

U.S. PATENT DOCUMENTS

| | | |
|---|---|---|
| 8,033,439 B2 | 10/2011 | Racenet et al. |
| 8,070,038 B2 | 12/2011 | Kostrzewski |
| 8,231,041 B2 | 7/2012 | Marczyk et al. |
| 8,292,904 B2 | 10/2012 | Popovic et al. |
| 8,328,064 B2 | 12/2012 | Racenet et al. |
| 8,360,296 B2 | 1/2013 | Zingman |
| 8,424,738 B2 | 4/2013 | Kasvikis |
| 8,499,994 B2 | 8/2013 | D'Arcangelo |
| 8,596,515 B2 | 12/2013 | Okoniewski |
| 8,627,994 B2 | 1/2014 | Zemlok et al. |
| 8,646,673 B2 | 2/2014 | Bilotti et al. |
| 8,757,467 B2 | 6/2014 | Racenet et al. |
| 8,936,185 B2 | 1/2015 | Racenet et al. |
| 8,955,732 B2 | 2/2015 | Zemlok et al. |
| 8,967,446 B2 | 3/2015 | Beardsley et al. |
| 9,022,273 B1 | 5/2015 | Marczyk et al. |
| 9,125,651 B2 | 9/2015 | Mandakolathur Vasudevan et al. |
| 9,192,382 B2 | 11/2015 | Kostrzewski |
| 9,192,387 B1 | 11/2015 | Holsten et al. |
| 9,480,474 B2 | 11/2016 | Ji et al. |
| 9,566,066 B2 | 2/2017 | Kasvikis |
| 9,579,102 B2 | 2/2017 | Holsten et al. |
| 9,655,619 B2 | 5/2017 | Zhang et al. |
| 9,662,111 B2 | 5/2017 | Holsten et al. |
| 9,668,736 B2 | 6/2017 | Holsten et al. |
| 9,675,349 B2 | 6/2017 | Holsten et al. |
| 9,675,350 B2 | 6/2017 | Holsten et al. |
| 9,675,356 B2 | 6/2017 | Racenet et al. |
| 9,814,460 B2 | 11/2017 | Kimsey et al. |
| 9,888,923 B2 | 2/2018 | Chen et al. |
| 9,962,159 B2 | 5/2018 | Heinrich et al. |
| 10,004,504 B2 | 6/2018 | Bryant |
| 10,085,754 B2 | 10/2018 | Sniffin et al. |
| 10,194,913 B2 | 2/2019 | Nalagatla et al. |
| 2004/0164123 A1 | 8/2004 | Racenet et al. |
| 2005/0247752 A1 | 11/2005 | Kelly et al. |
| 2005/0247753 A1 | 11/2005 | Kelly et al. |
| 2006/0163312 A1 | 7/2006 | Viola et al. |
| 2007/0187456 A1 | 8/2007 | Viola et al. |
| 2010/0048988 A1 | 2/2010 | Pastorelli et al. |
| 2013/0206813 A1 | 8/2013 | Nalagatla |
| 2016/0249914 A1 | 9/2016 | Zhang et al. |
| 2016/0249923 A1 | 9/2016 | Hodgkinson et al. |
| 2016/0270784 A1 | 9/2016 | Wheeler et al. |
| 2016/0270790 A1 | 9/2016 | Jankowski |
| 2016/0270793 A1 | 9/2016 | Carter et al. |
| 2016/0278779 A1 | 9/2016 | Jankowski |
| 2017/0014134 A1 | 1/2017 | Chen et al. |
| 2017/0027571 A1 | 2/2017 | Nalagatla et al. |
| 2017/0027572 A1 | 2/2017 | Nalagatla et al. |
| 2017/0027573 A1 | 2/2017 | Nalagatla et al. |
| 2017/0027574 A1 | 2/2017 | Nalagatla et al. |
| 2017/0128149 A1 | 5/2017 | Heinrich et al. |
| 2017/0238923 A1 | 8/2017 | Holsten et al. |
| 2017/0238924 A1 | 8/2017 | Holsten et al. |
| 2017/0265861 A1 | 9/2017 | Holsten et al. |
| 2018/0008261 A1 | 1/2018 | Racenet et al. |
| 2018/0049739 A1 | 2/2018 | Kasvikis |
| 2018/0153544 A1 | 6/2018 | Maddur Shankarsetty et al. |
| 2018/0221024 A1 | 8/2018 | Heinrich et al. |

FOREIGN PATENT DOCUMENTS

| | | |
|---|---|---|
| JP | 2015-509393 A | 3/2015 |
| WO | 2020/261045 A1 | 12/2020 |
| WO | 2021022407 A1 | 2/2021 |

OTHER PUBLICATIONS

Written Opinion for Application No. PCT/CN2021/083964 dated Jan. 7, 2022.
Notice of Allowance for Japanese Patent Application No. 2023-560517 mailed Dec. 2, 2024, 6 pages.

* cited by examiner

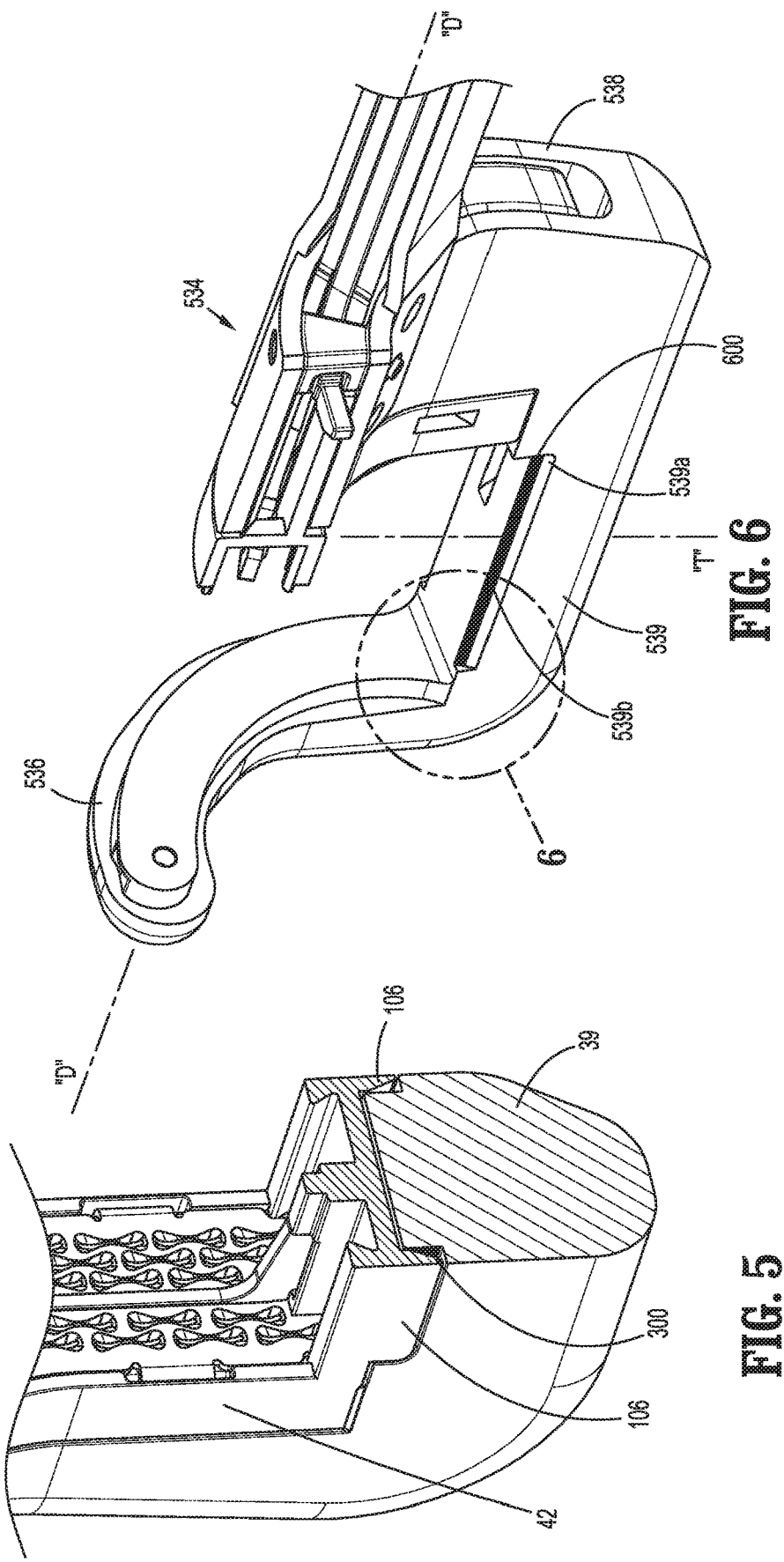

SURGICAL STAPLING DEVICE INCLUDING A LOADING UNIT ALIGNMENT INDICATOR

FIELD

The disclosure generally relates to surgical stapling devices and, more particularly, to surgical stapling devices that include a loading unit alignment indicator.

BACKGROUND

Surgical stapling devices are commonly used during a variety of surgical procedures to expedite dissection and suturing of tissue and minimize trauma to a patient. Typically, the stapling devices include an end effector that includes a cartridge assembly and an anvil assembly. The cartridge assembly and the anvil assembly are movable in relation to each other between open and clamped positions to clamp tissue therebetween. When tissue is clamped between the cartridge and anvil assemblies, the stapling device can be fired to eject staples from the cartridge assembly into a staple forming surface of the anvil assembly to suture the tissue. The stapling devices often include a knife assembly that includes a cutting blade that is advanced from within the cartridge assembly into the anvil assembly to cut the tissue clamped between the cartridge and anvil assemblies.

Surgical stapling devices are available in a variety of types for performing a variety of different surgical procedures. One type of stapling device includes a U-shaped end effector that has a body having a first transverse portion, a second transverse portion, and a longitudinal portion interconnecting the first transverse portion and the second transverse portion. Each of the first and second end portions has a first end coupled to the longitudinal portion and a second end. The cartridge assembly is releasably supported on a clamp slide assembly adjacent the second transverse portion and is movable towards the first transverse portion to move cartridge assembly into juxtaposed alignment with the anvil assembly. The anvil assembly is supported on the first transverse portion which extends from the longitudinal portion in cantilevered fashion. In such devices, the cartridge assembly is loaded onto the clamp slide assembly prior to use of the stapling device.

During a surgical procedure, the anvil and cartridge assemblies are moved into juxtaposed alignment and subsequently the staples and the cutting blade are driven from the cartridge assembly into the anvil assembly. A continuing need exists in the art for a stapling device that provides an indication to a clinician that the cartridge assembly has been properly mounted on the end effector for proper stapling and cutting of tissue.

SUMMARY

In accordance with the disclosure, an end effector includes a frame having a U-shaped configuration and a loading unit removably supported on the frame. The frame includes first and second transverse portions and a longitudinal portion interconnecting the first and second transverse portions. The longitudinal portion defines a longitudinal axis and includes a coupling portion having a visual indicator. The loading unit includes an anvil plate supported on the first transverse portion of the frame, a base portion extending proximally from the anvil plate, and a cartridge assembly supported on the base portion and movable in relation to the anvil plate between spaced and clamped positions. The base portion includes a flange configured to engage the coupling portion of the longitudinal portion of the frame such that the visual indicator is concealed by the flange when the loading unit is in registration with the frame.

In an aspect, the coupling portion of the longitudinal portion may define a cutout configured to receive the flange of the base portion of the loading unit.

In another aspect, the coupling portion may include an inner surface including the visual indicator.

In yet another aspect, the inner surface of the coupling portion may at least partially define the cutout.

In still yet another aspect, the flange of the base portion may be laterally tapered.

In an aspect, the cutout of the longitudinal portion may include a peripheral edge portion having an arcuate profile.

In another aspect, the visual indicator of the longitudinal portion of the frame may extend along a length of the longitudinal portion.

In yet another aspect, the inner surface of the longitudinal portion may define an acute angle with respect to an axis orthogonal to the longitudinal axis of the longitudinal portion.

In still yet another aspect, the inner surface of the coupling portion may be orthogonal to the longitudinal axis of the longitudinal portion of the frame.

In an aspect, the visual indicator of the coupling portion may include a colored indicia located along the inner surface of the coupling portion.

In still yet another aspect of the disclosure, the inner surface of the coupling portion and the flange may be slidably engageable such that when the loading unit is supported on the frame the coupling portion and the flange are in a planar contact.

In accordance with another aspect of the disclosure, a surgical stapling device includes a handle assembly, an elongate body having a proximal portion coupled to the handle assembly and a distal portion, and an end effector coupled to the distal portion of the elongate body. The end effector includes a frame having a U-shaped configuration and a loading unit removably supported on the frame. The frame includes first and second transverse portions and a longitudinal portion interconnecting the first and second transverse portions. The first transverse portion is spaced from the second transverse portion to define a recess. The longitudinal portion defines a longitudinal axis and includes a coupling portion having a visual indicator. The loading unit includes an anvil plate supported on the first transverse portion of the frame, a base portion extending from the anvil plate, and a cartridge assembly supported on the base portion and movable in relation to the anvil plate between spaced and clamped positions. The base portion includes opposing flanges configured to receive the coupling portion of the longitudinal portion between the opposing flanges and conceal the visual indicator when the loading unit is in registration with the frame.

In an aspect, the coupling portion of the longitudinal portion may have an inner surface in a planar contact with the opposing flanges of the base portion when the loading unit is in registration with the frame.

In another aspect, the inner surface may include the visual indicator.

In yet another aspect, the visual indicator of the longitudinal portion of the frame may extend along a length of the longitudinal portion.

In still yet another aspect, the visual indicator of the coupling portion may include a colored indicia located along the inner surface of the coupling portion.

In an aspect, the coupling portion of the longitudinal portion may define cutouts configured to receive the opposing flanges of the base portion of the loading unit.

In another aspect, each flange of the opposing flanges may be laterally tapered.

In yet another aspect, the inner surface of the longitudinal portion may define an acute angle with respect to an axis orthogonal to the longitudinal axis of the longitudinal portion.

BRIEF DESCRIPTION OF THE DRAWINGS

Various aspects of the disclosure are described herein below with reference to the drawings, wherein:

FIG. 5 is a perspective view of the end effector of FIG. 4 taken along section line 5-5 of FIG. 4;

FIG. 6 is a perspective view of an end effector in accordance with another aspect of the disclosure;

DETAILED DESCRIPTION

Figure 1:
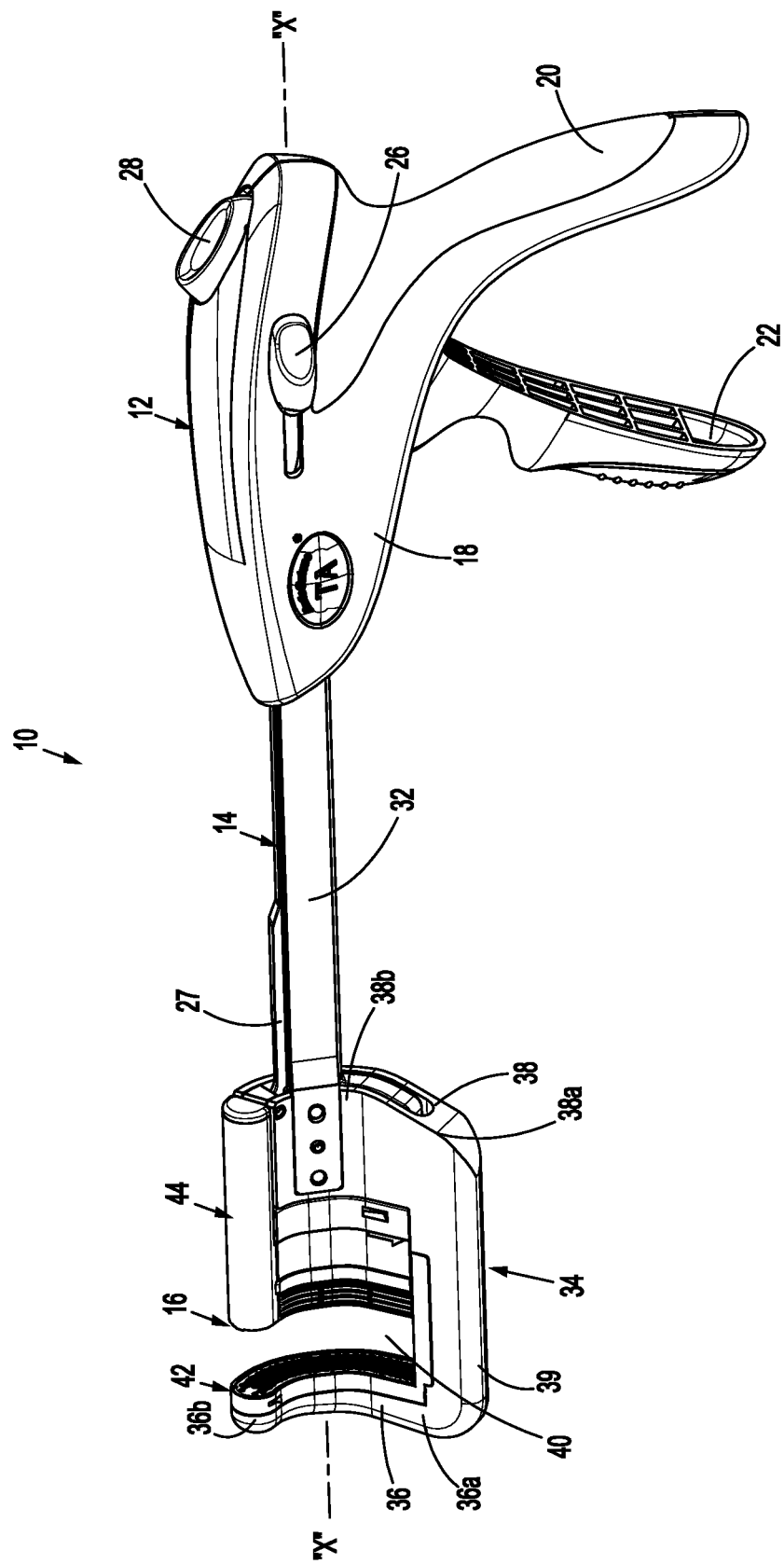
FIG. 1 is a perspective view of a stapling device in accordance with the disclosure.

The disclosed surgical stapling devices will now be described in detail with reference to the drawings in which like reference numerals designate identical or corresponding elements in each of the several views. However, it is to be understood that the aspects of the disclosure are merely exemplary and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure. In addition, directional terms such as front, rear, upper, lower, top, bottom, distal, proximal, and similar terms are used to assist in understanding the description and are not intended to limit the disclosure. In this description, the term "proximal" is used generally to refer to that portion of the device that is closer to a clinician during use of the device in its customary manner, while the term "distal" is used generally to refer to that portion of the device that is farther from the clinician during use of the device in its customary manner. In addition, the term "clinician" is used generally to refer to medical personnel including doctors, nurses, and support personnel. "About" or "approximately" or "substantially" as used herein may be inclusive of the stated value and means within an acceptable range of variation for a particular value as determined by one of ordinary skill in the art, considering the measurement in question and the error associated with measurement of the particular quantity (e.g., the limitations of the measurement system). For example, "about" may mean within one or more standard variations, within ±10% of the stated value, or within 2-3 degrees of the stated angle.

FIG. 1 illustrates the disclosed surgical stapling device shown generally as a stapling device 10. The stapling device 10 includes a handle assembly 12, an elongate body 14 that extends distally from the handle assembly 12, and an end effector 16 that is supported on a distal portion of the elongate body 14. The elongate body 14 defines a longitudinal axis "X-X." The handle assembly 12 includes a housing 18 that includes a stationary handle 20 and supports a movable trigger 22. In aspects of the disclosure, the movable trigger 22 is supported on the housing 18 to pivot towards the stationary handle 20 between non-actuated and actuated positions to operate the end effector 16. The handle assembly 12 also supports buttons 26 (only one is shown) that are positioned on each side of the housing 18 and are movable along the housing 18 to advance and retract an alignment pin pusher 27. The alignment pin pusher 27 is positioned and configured to engage an alignment pin (not shown) within the end effector 16 to move the alignment pin between retracted position and advanced positions. The handle assembly 12 also includes a release button 28 that can be depressed to move the end effector 16 from a clamped position to an unclamped position. For a more detailed description of a suitable handle assembly 12, see, e.g., U.S. Pat. No. 6,817,508 ("the '508 patent").

The elongate body 14 of the stapling device 10 includes a frame 32 that extends from the handle assembly 12 to the end effector 16. The frame 32 includes a distal frame portion 34 that has a U-shaped configuration that forms a portion of the end effector 16. The distal frame portion 34 has a first transverse portion 36, a second transverse portion 38, and a longitudinal portion 39 that interconnects the first transverse portion 36 and the second transverse portion 38. The first and second transverse portions 36, 38 are spaced from each other to define a recess 40 that extends between the first and second transverse portions 36, 38. In some aspects of the disclosure, the first and second transverse portions 36, 38 are curved along axes transverse to the longitudinal axis "X" of the elongate body 14 of the stapling device 10. Alternately, the first and second transverse portions may be linear or comprised of a plurality of linear portions that are positioned at angles in relation to each other. Each of the first and second transverse portions 36, 38 has a first end 36a, 38a, respectively, that are coupled to (e.g., formed with) the longitudinal portion 39 of the distal frame portion 34 and a second end 36b, 38b, respectively. The second end 38b of the second transverse portion 38 is coupled to the frame 32 of the elongate body 14. The second end 36b of the first transverse portion 36 of the distal frame portion 34 is spaced from the longitudinal portion 39 such that the first transverse portion 36 is supported on the longitudinal portion 39 in cantilevered fashion. The longitudinal portion 39 defines cutouts 39a (only one shown in FIG. 2) on opposing lateral sides of the longitudinal portion 39 and includes opposing inner surfaces 39b at least partially defining the cutouts 39a. The opposing inner surfaces 39b include a visual indicator 300 to indicate proper mounting or registration of the loading unit 100 on the distal frame portion 34, as will be described below.

Figure 2:
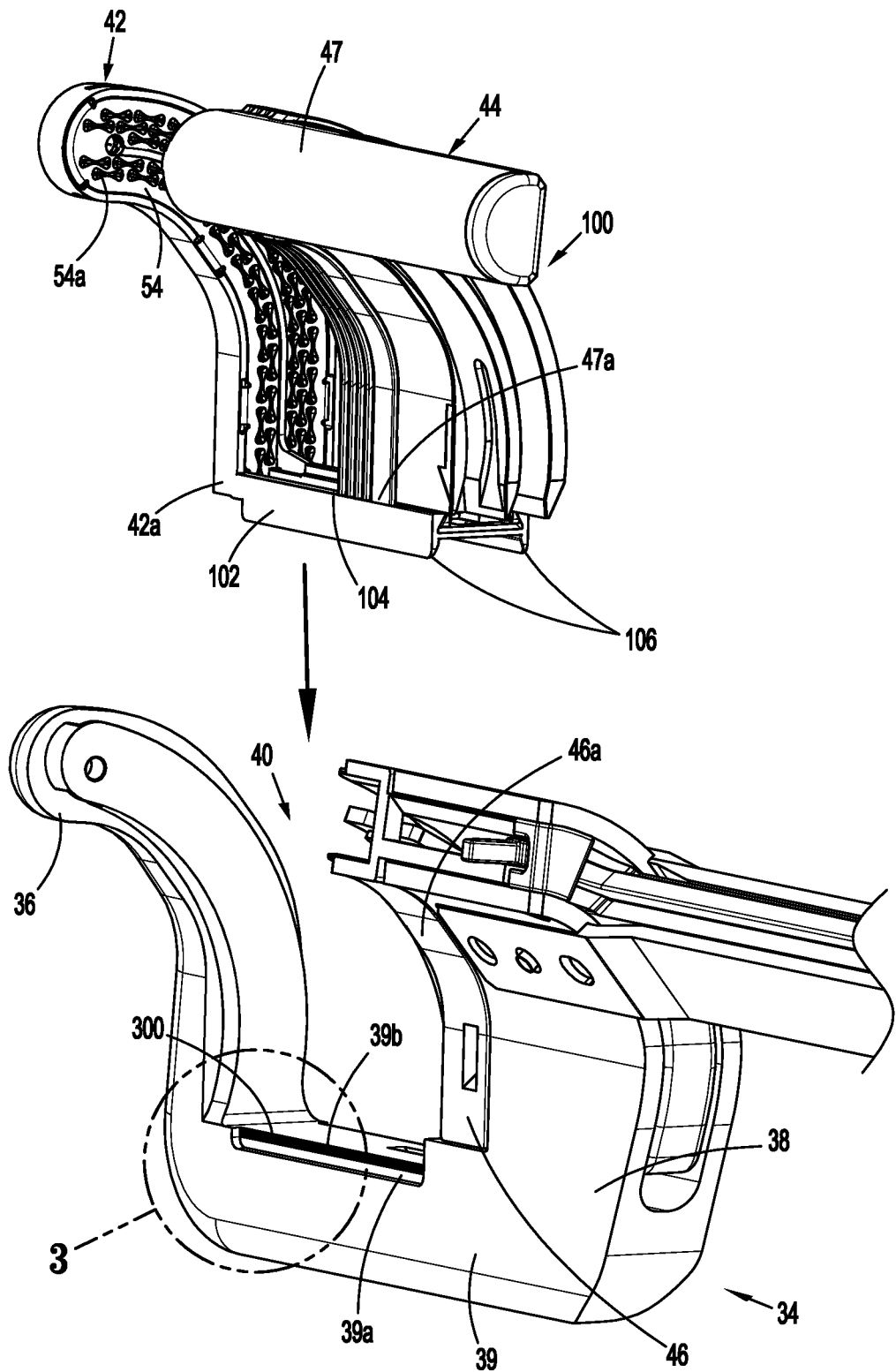
FIG. 2 is a perspective view of an end effector of the stapling device of FIG. 1, illustrating a loading unit detached from a distal frame portion.

With reference to FIG. 2, the end effector 16 includes a loading unit 100 removably mountable on the distal frame portion 34 of the frame 32 (FIG. 1). In particular, the loading unit 100 is removably supported on a clamp slide assembly 46 of the stapling device 10. The loading unit 100 includes an anvil assembly 42, a cartridge assembly 44, and a base portion 102. The cartridge assembly 44 includes a body 47 that supports a plurality of staples (not shown). The clamp slide assembly 46 includes a distal portion 46a that is configured to releasably support the cartridge assembly 44. The distal portion 46a is positioned in the recess 40 and is movable between retracted and advanced positions to move the cartridge assembly 44 in relation to the anvil assembly 42 through the recess 40 between an unclamped position (FIG. 1) located adjacent to the second transverse portion 38 of the distal frame portion 34 and a clamped position located adjacent the first transverse portion 36 of the distal frame portion 34. The cartridge assembly 44 includes the cartridge body 47, a knife assembly (not shown), a pusher (not shown), and staples (not shown). The cartridge body 47 defines a cavity (not shown) that receives the knife assembly and the pusher such that the knife assembly and the pusher can move within the cartridge body 47 of the cartridge assembly 44 from a retracted position to an advanced position. The cartridge body 47 defines a plurality of staple receiving slots (not shown) and a knife slot (not shown) that extends between the staple receiving slots. In aspects of the disclosure, the staple receiving slots are aligned in curved rows on opposite sides of the knife slot, and the knife slot is curved and centrally located in the cartridge body 47. For a detailed description of exemplary aspects of the operation and construction of a clamp slide assembly, see the '508 patent.

Each of the staples (not shown) is received in one of the staple receiving slots in the cartridge body 47. The pusher includes a base member and a plurality of pusher fingers that extend distally from the base member. Each of the plurality of fingers extends into one of the plurality of staple receiving slots of the cartridge body 47 and includes a distal surface that supports one of the staples within the respective staple receiving slot. The base member of the pusher defines a central knife slot (not shown) that is positioned between the rows of the fingers and is aligned with the knife slot in the cartridge body 47.

The anvil assembly 42 is supported on the first transverse portion 36 of the distal frame portion 34 and includes an anvil plate 54 that defines a plurality of staple receiving deformations 54a. The anvil plate 54 has a configuration that correspond to the configuration of the first transverse portion 36 of the distal frame portion 34.

As discussed hereinabove, the loading unit 100 includes the anvil assembly 42, the base portion 102 extending proximally from a first end of the anvil assembly 42, and the cartridge assembly 44 slidably supported on the base portion 102. The anvil assembly 42 and the base portion 102 may be integrally formed as a single construct. The base portion 102 defines grooves 104 to slidably receive a first end portion 47a of the cartridge body 47. In addition, the base portion 102 includes opposing flanges 106 that are configured to be received in the respective cutouts 39a of the longitudinal portion 39 of the distal frame portion 34. Each cutout 39a may include peripheral edge portions 39d (FIG. 3) that have arcuate profile to facilitate receipt of and securement with one of the opposing flanges 106 of the loading unit 100. In addition, each flange 106 may be tapered laterally to facilitate insertion into and securement with the corresponding cutout 39a.

Figure 3:
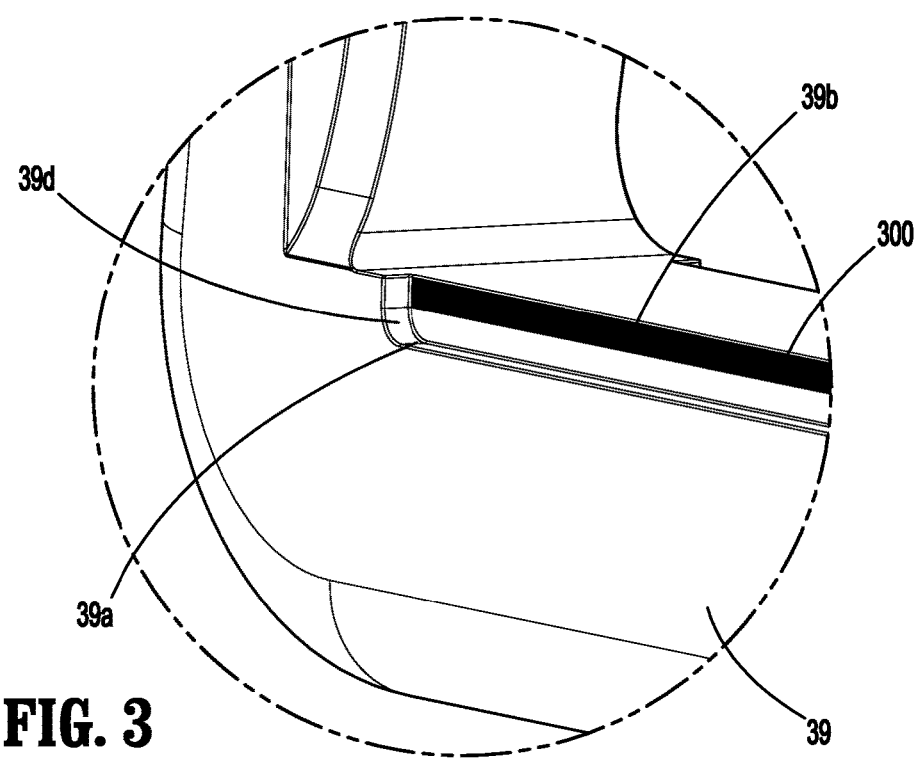
FIG. 3 is an enlarged view of the indicated area of detail of FIG. 2.
Figure 4:
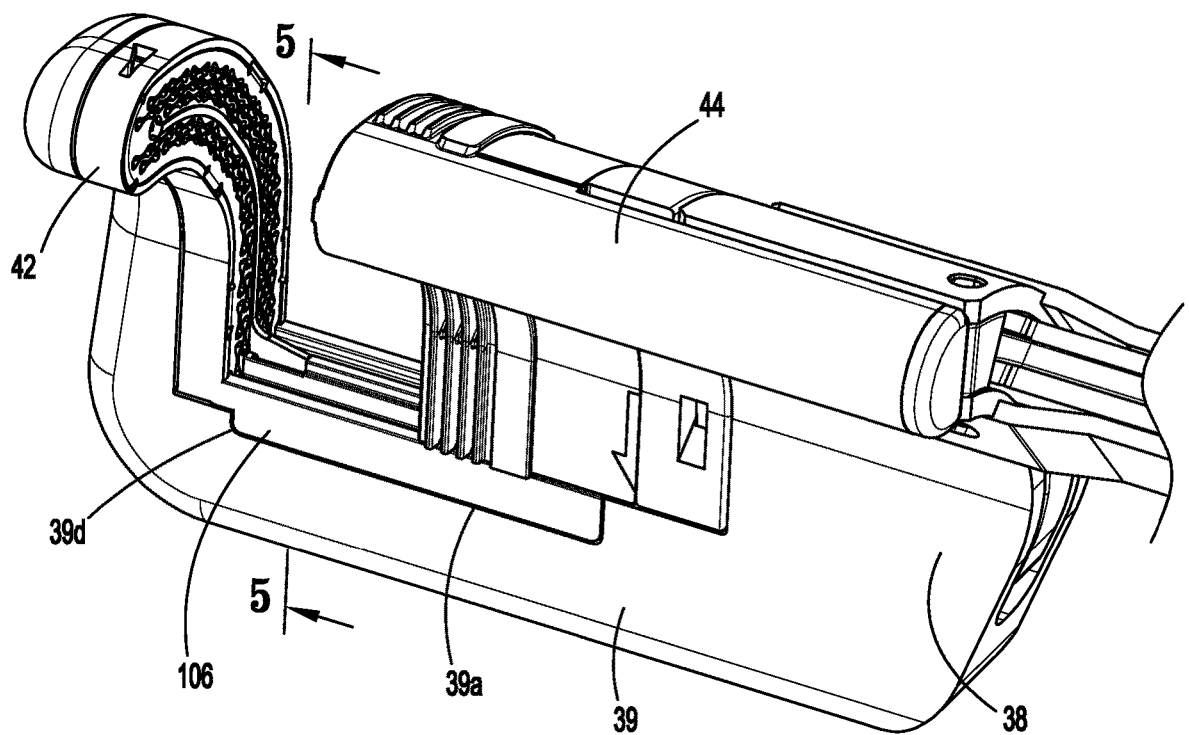
FIG. 4 is a partial perspective view of the end effector of the stapling device of FIG. 1.

FIGS. 3-5 illustrate the inner surface 39b of the longitudinal portion 39 of the distal frame portion 34 that includes the visual indicator 300 such as a colored indicia. For example, the visual indicator 300 may have a painted surface. Under such a configuration, when the loading unit 100 is properly mounted on the distal frame portion 34, i.e., in registration with the distal frame portion 34, the visual indicator 300 is completely hidden or concealed by the opposing flanges 106 of the loading unit 100, as shown in FIG. 4. In this manner, visual indication of proper mounting of the loading unit 100 is provided to the clinician.

Figure 7:
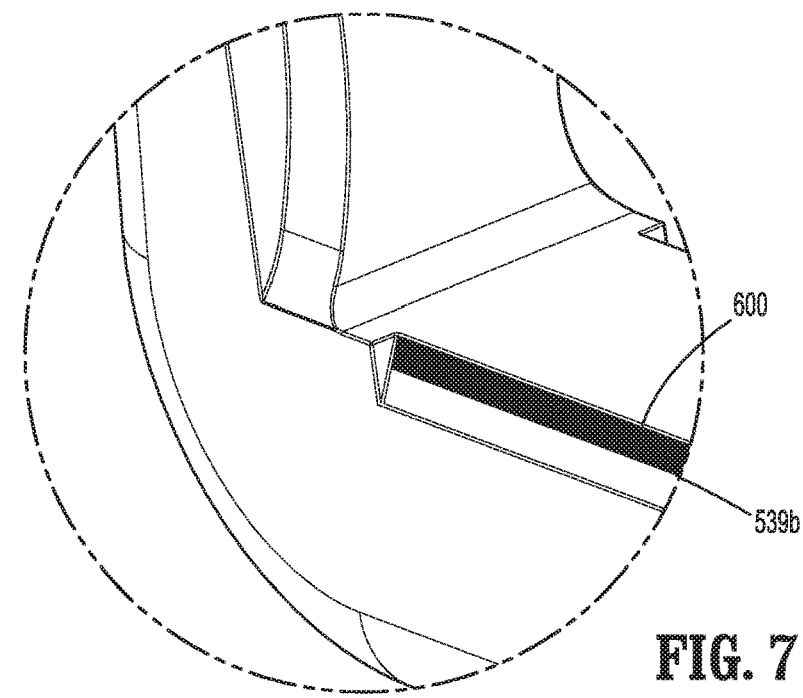
FIG. 7 is an enlarged view of the indicated area of detail of FIG. 6.
Figure 8:
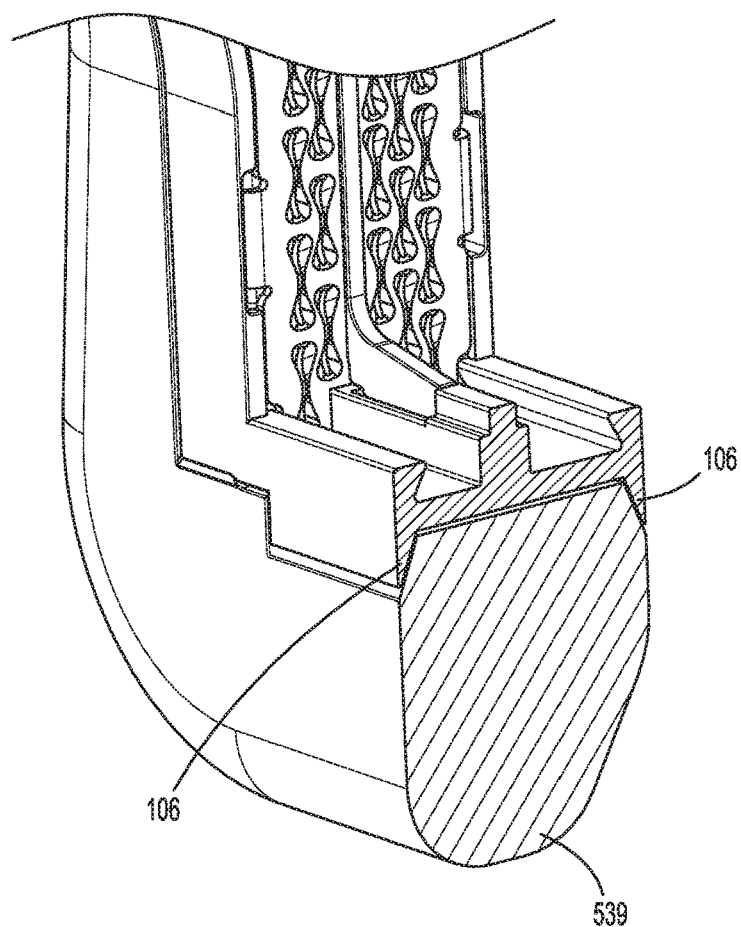
FIG. 8 is a partial perspective view of the end effector of FIG. 6 with a portion of a longitudinal portion removed.

With reference to FIG. 6, a distal frame portion 534 in accordance with another aspect of the disclosure is illustrated. Parts of the distal frame portion 534 substantially similar to parts of the distal frame portion 34 (FIG. 1) will not be described in order to avoid obscuring the disclosure in unnecessary detail. The distal frame portion 534 includes a longitudinal portion 539 that interconnects first and second transverse portions 536, 538. The longitudinal portion 539 defines cutouts 539a (only one shown) on opposing lateral sides thereof and includes opposing inner surfaces 539b (only one shown). The opposing inner surfaces 539b at least partially define the respective cutouts 539a. The opposing inner surfaces 539b include visual indicator 600. The visual indicator 600 can be viewed by a clinician to determine proper alignment or mounting of the loading unit 100 on the distal frame portion 534. More specifically, the visual indicator 600 is completely concealed or hidden when the loading unit 100 is properly mounted on or in registration with the distal frame portion 539, as shown in FIG. 8. In contrast to the distal frame portion 34, each inner surface 539b of the longitudinal portion 539 of the distal frame portion 534 defines an acute angle with respect to an axis "T" that is orthogonal to a longitudinal axis "D" defined by the distal frame portion 534, as shown in FIG. 7. Under such a configuration, the inner surfaces 539b may slidably engage the respective opposing flanges 106 (FIG. 2) that are tapered laterally outwards such that the opposing flanges 106 and the inner surfaces 539b are in a planar contact. Such a configuration facilitates mounting of the loading unit 100 on the distal frame portion 539.

In use, the loading unit 100 (FIG. 2) is mounted on the distal frame portion 34 (FIG. 2). Upon mounting the loading unit 100 on the distal frame portion 34, the clinician checks the distal frame portion 34 to determine if the clinician can observe the visual indicator 300. If the visual indicator 300 is concealed or hidden, the clinician may proceed with the use of the stapling device 10. If at least a portion of the visual indicator 300 can be seen, the clinician may adjust the loading unit 100 relative to the distal frame portion 34 for proper mounting or registration until the visual indicator 300 is completely hidden. Upon achieving proper mounting or registration of the loading unit 100 on the distal frame portion 34, the stapling device 10 may be actuated to fire staples and cut tissue, as needed. When the stapling device 10 is fired to eject the staples from the cartridge body 47 of the cartridge assembly 44, the pusher is advanced to advance the fingers within the staple receiving slots of the cartridge body 47. The use of the stapling device including the distal frame portion 534 (FIG. 7) is substantially identical to the use of the stapling device 10 described hereinabove, and thus, will not be described herein.

Persons skilled in the art will understand that the devices and methods specifically described herein and illustrated in the accompanying drawings are non-limiting exemplary aspects of the disclosure. It is envisioned that the elements and features illustrated or described in connection with one exemplary aspect of the disclosure may be combined with the elements and features of another without departing from the scope of the disclosure. As well, one skilled in the art will appreciate further features and advantages of the disclosure based on the above-described aspects of the disclosure.

Accordingly, the disclosure is not to be limited by what has been particularly shown and described, except as indicated by the appended claims.

What is claimed is:

1. An end effector comprising:
a frame having a U-shaped configuration and including:
first and second transverse portions; and
a longitudinal portion interconnecting the first and second transverse portions, the longitudinal portion defining a longitudinal axis, the longitudinal portion including a coupling portion including a visual indicator; and
a loading unit removably supported on the frame, the loading unit including:
an anvil plate supported on the first transverse portion of the frame;
a base portion extending proximally from the anvil plate, the base portion including a flange configured to engage the coupling portion of the longitudinal portion of the frame such that the visual indicator is concealed by the flange when the loading unit is in proper registration with the frame; and
a cartridge assembly supported on the base portion and movable in relation to the anvil plate between spaced and clamped positions.

2. The end effector according to claim 1, wherein the coupling portion of the longitudinal portion defines a cutout configured to receive the flange of the base portion of the loading unit.

3. The end effector according to claim 2, wherein the coupling portion includes an inner surface including the visual indicator.

4. The end effector according to claim 3, wherein the inner surface of the coupling portion at least partially defines the cutout.

5. The end effector according to claim 3, wherein the inner surface of the longitudinal portion defines an acute angle with respect to an axis orthogonal to the longitudinal axis of the longitudinal portion.

6. The end effector according to claim 3, wherein the inner surface of the coupling portion is orthogonal to the longitudinal axis of the longitudinal portion of the frame.

7. The end effector according to claim 3, wherein the visual indicator of the coupling portion includes a colored indicia located along the inner surface of the coupling portion.

8. The end effector according to claim 3, wherein the inner surface of the coupling portion and the flange are slidably engageable such that when the loading unit is supported on the frame the coupling portion and the flange are in a planar contact.

9. The end effector according to claim 2, wherein the cutout of the longitudinal portion includes a peripheral edge portion having an arcuate profile.

10. The end effector according to claim 1, wherein the flange of the base portion is laterally tapered.

11. The end effector according to claim 1, wherein the visual indicator of the longitudinal portion of the frame extends along a length of the longitudinal portion.

12. A surgical stapling device comprising:
a handle assembly;
an elongate body having a proximal portion coupled to the handle assembly and a distal portion; and
an end effector coupled to the distal portion of the elongate body, the end effector including:
a frame having a U-shaped configuration and including:
first and second transverse portions, the first transverse portion being spaced from the second transverse portion to define a recess; and
a longitudinal portion interconnecting the first and second transverse portions, the longitudinal portion defining a longitudinal axis, the longitudinal portion including a coupling portion including a visual indicator; and
a loading unit removably supported on the frame, the loading unit including:
an anvil plate supported on the first transverse portion of the frame;
a base portion extending from the anvil plate, the base portion including opposing flanges configured to receive the coupling portion of the longitudinal portion between the opposing flanges and conceal the visual indicator when the loading unit is in registration with the frame; and
a cartridge assembly supported on the base portion and movable in relation to the anvil plate between spaced and clamped positions.

13. The surgical stapling device according to claim 12, wherein the coupling portion of the longitudinal portion has an inner surface in a planar contact with the opposing flanges of the base portion when the loading unit is in registration with the frame.

14. The surgical stapling device according to claim 13, wherein the inner surface includes the visual indicator.

15. The surgical stapling device according to claim 14, wherein the visual indicator of the longitudinal portion of the frame extends along a length of the longitudinal portion.

16. The surgical stapling device according to claim 14, wherein the visual indicator of the coupling portion includes a colored indicia located along the inner surface of the coupling portion.

17. The surgical stapling device according to claim 13, wherein the inner surface of the longitudinal portion defines an acute angle with respect to an axis orthogonal to the longitudinal axis of the longitudinal portion.

18. The surgical stapling device according to claim 12, wherein the coupling portion of the longitudinal portion defines cutouts configured to receive the opposing flanges of the base portion of the loading unit.

19. The surgical stapling device according to claim 12, wherein each flange of the opposing flanges is laterally tapered.

* * * * *